March 6, 1962 R. W. SLACK 3,023,562
COMBINATION SPREADER AND MOWER
Filed Aug. 21, 1959 3 Sheets-Sheet 1

INVENTOR.
ROBERT W. SLACK
BY M. A. Hobbs
ATTORNEY

March 6, 1962 R. W. SLACK 3,023,562
COMBINATION SPREADER AND MOWER
Filed Aug. 21, 1959 3 Sheets-Sheet 2
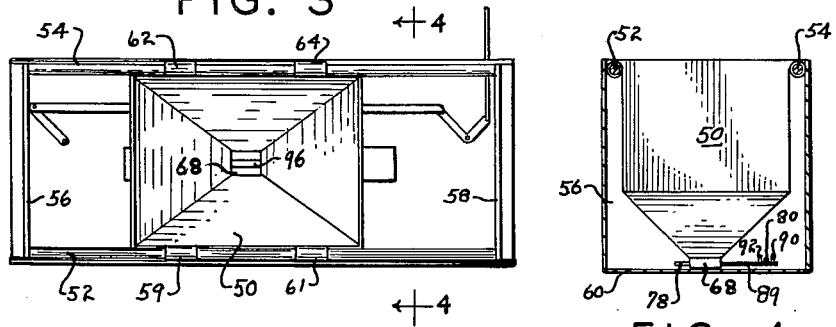
FIG. 3
FIG. 4
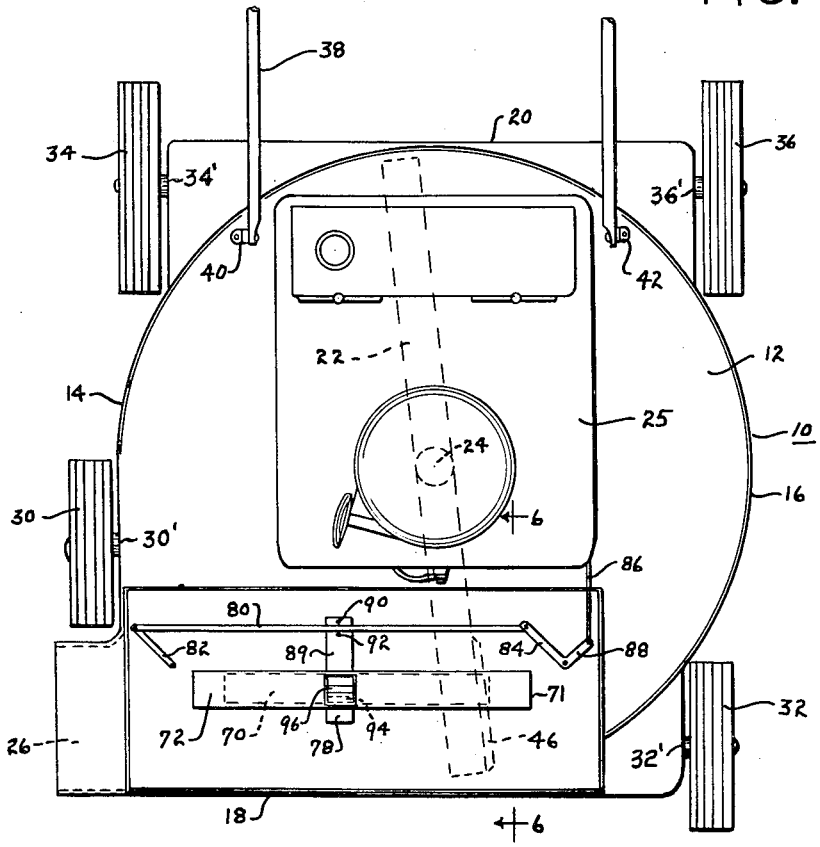
FIG. 5
INVENTOR.
ROBERT W. SLACK
BY *M. A. Hobbs*
ATTORNEY March 6, 1962 R. W. SLACK 3,023,562
COMBINATION SPREADER AND MOWER
Filed Aug. 21, 1959 3 Sheets-Sheet 3

INVENTOR.
ROBERT W. SLACK
BY *m. a. Hobbs*
ATTORNEY

3,023,562
COMBINATION SPREADER AND MOWER
Robert W. Slack, R.R. 1, Plymouth, Ind.
Filed Aug. 21, 1959, Ser. No. 835,320
6 Claims. (Cl. 56—25.4)

The present invention relates to a mower and spreader and more particularly to a combination of a rotary mower or chopper and a spreader for fertilizer, seed, weed killer and similar materials.

One of the principal objects of the present invention is to provide a rotary mower and spreader combination which can be operated either as a mower or spreader separately or in combination to perform the mowing and spreading operations simultaneously.

Another object of the invention is to provide a combination mower and spreader which can be readily converted from one type of operation to the other by a mere shifting of a control lever in easy reach of the operator and in which each type of mechanism will operate effectively without interference from the other mechanism.

Still another object of the invention is to provide a combination mower and spreader for use on home, playground, park and similar lawns, and agricultural fields, which can be easily handled and manipulated to perform either or both of the two operations and which is not appreciably heavier or larger than separate conventional power mowers and spreaders.

A further object is to provide a convertible mower and spreader combination in which the discharge for the spreader can be effectively controlled to cover with fertilizer or seed on a single pass a wide area many times wider than the apparatus or a narrow area only as wide as the apparatus itself, and which can be readily adjusted between the narrow and broad area spreading operations.

Another object of the invention is to provide a versatile mower-spreader combination which can be easily operated by an unskilled operator under varying conditions to mow and reseed or fertilize and which can be adjusted during the operation to give the desired degree of reseeding or fertilizing.

Another object of the invention is to provide a spreader attachment which can be readily installed on conventional rotary power mowers and effectively used in conjunction therewith to perform various types of spreading operations, without any substantial changes in the construction and operation of the mower being required.

Additional objects and advantages of the present invention will become apparent from the following description and accompanying drawings, wherein:

FIGURE 3 is an enlarged top plan view of the spreader mechanism removed from the mower body;

FIGURE 4 is a vertical cross sectional view through the spreader, taken on line 4—4 of FIGURE 3;

FIGURE 5 is an enlarged top plan view of my mower and spreader combination with the spreader hopper removed to show more clearly the control mechanism for the spreader;

Figure 1:
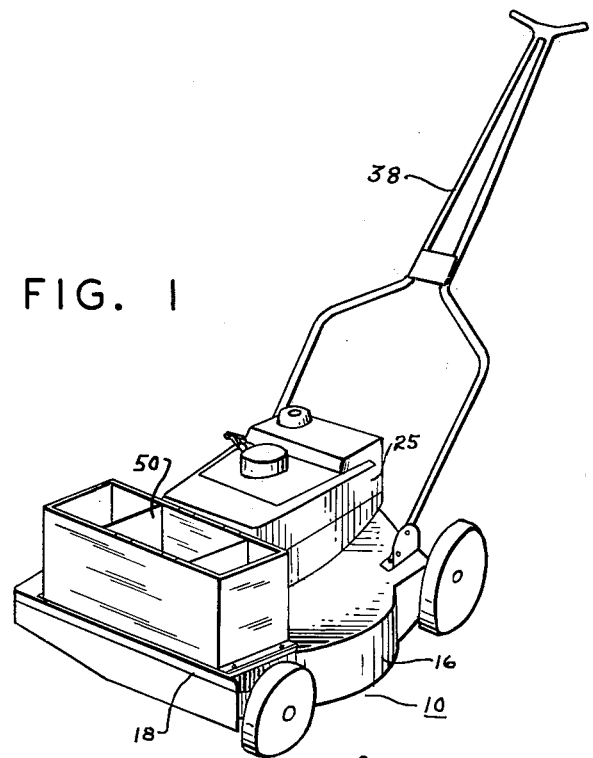
FIGURE 1 is a perspective view of a combination mower and spreader, illustrating the present invention.
Figure 2:
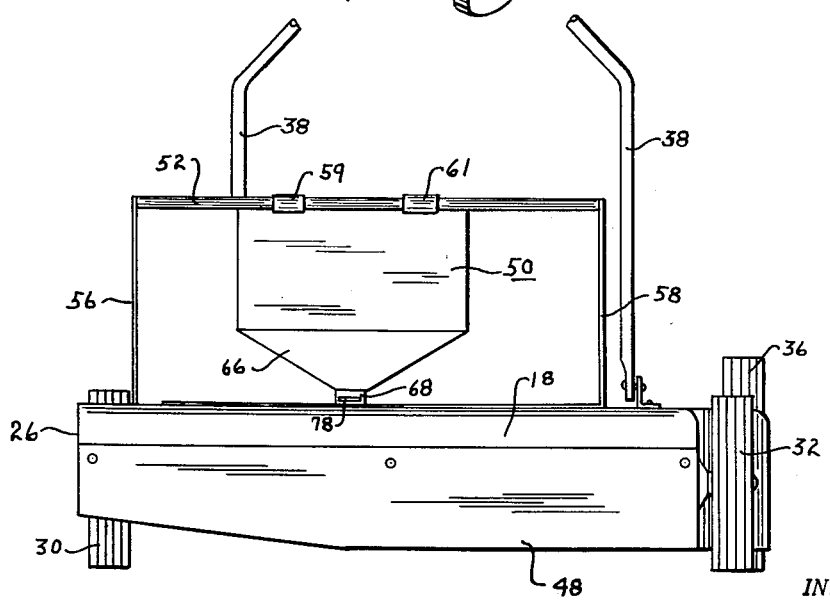
FIGURE 2 is an enlarged front elevational view of my combination mower and spreader, with the front of the spreader housing removed to better show the construction of the mechanism.
Figure 6:
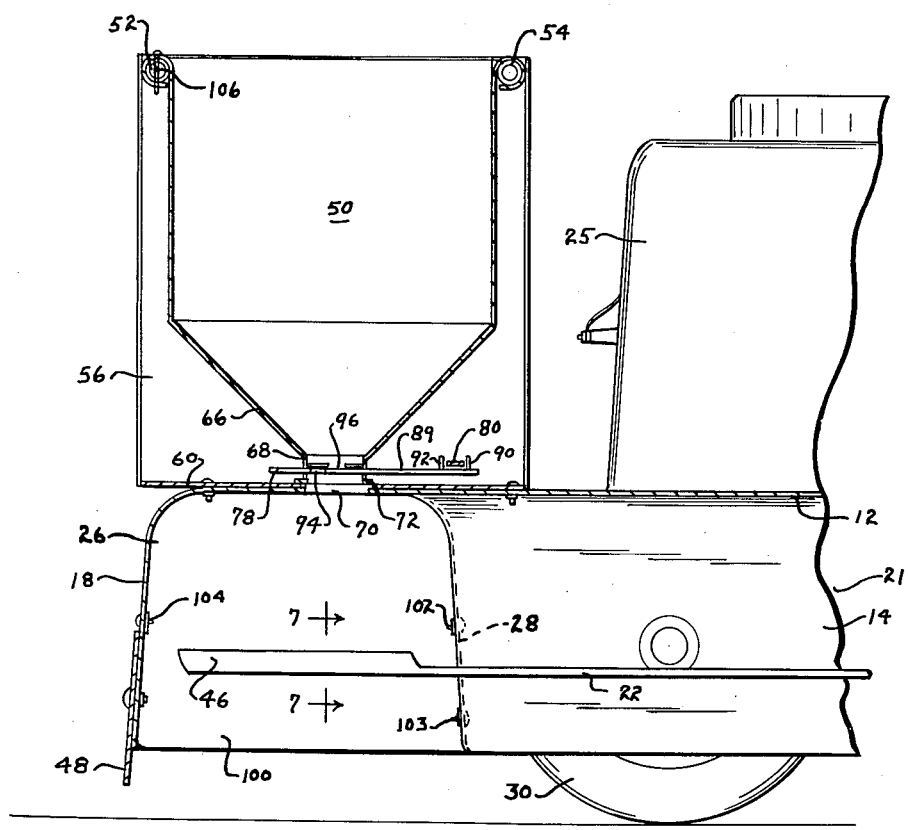
FIGURE 6 is an enlarged fragmentary cross sectional view of my mower and spreader combination taken on line 6—6 of FIGURE 5.
Figure 7:
FIGURE 7 is a vertical cross sectional view through the mower blade, taken on line 7—7 of FIGURE 6.

Referring more specifically to the drawings, numeral 10 designates the body of a conventional rotary type lawn mower having a top portion 12, right and left sides 14 and 16 and front and back 18 and 20. The chamber 21 beneath the body contains a rotatable blade 22 mounted on a shaft 24 and driven by a gasoline engine 25 mounted on top portion 12 of the body. A discharge passage 26 is provided in the forward end of the right side 14 and is defined by an extension of the front and top and a side flange 28. The body is supported by four rubber tired wheels 30, 32, 34 and 36 on shafts 30', 32', 34' and 36', respectively, secured to the right and left sides of the body, and is pushed and steered by a handle 38 secured to the body top by brackets 40 and 42. The cutting blade 22 is a single straight shaft with a sharp forward edge 44 on each part extending outwardly from the center shaft and with an upwardly extending deflector 46 on the back side of the blade near the outer end thereof, and is driven by motor 25 in the clockwise direction as viewed in FIGURE 5. A shield 48 is attached to the front of the body and is adapted to be adjusted upwardly or downwardly to give the desired spacing from the ground. The mower and the parts thereof thus far described may for the purpose of the present description be considered conventional in construction and operation and the type shown is the size normally used for mowing home lawns and other relatively small plots of grass.

Mounted on the forward end of body 10 is a hopper 50, for fertilizer, seed and similar materials, supported by two transversely arranged rods 52 and 54. These rods are supported at their ends by panels 56 and 58 which in turn are rigidly secured to a bottom panel 60. The frame formed by the rods and panels is bolted or otherwise rigidly secured to the top 12 of the body and may be removed from the mower when the spreader is not being used. The hopper is attached to rods 52 and 54 by metal straps 59, 61, 62 and 64 attached to the sides of the hopper and looped around the rods. These straps permit the hopper to be shifted to any desired position between end panels 56 and 58.

In the embodiment shown in the drawings, the hopper is rectangular in cross sectional shape and is provided with a sloping bottom 66 terminating at the lower end in a small chute 68 which connects the hopper with chamber 21 above the path traveled by the portion of the cutting blade containing deflector 46. The lower end of the chute is positioned directly above an elongated slot 70 in the bottom panel 60 and top 12 of the body, the slot extending from approximately the front center 71 of the body toward discharge opening 26. This slot permits the discharge end of the chute to be adjusted toward or away from the discharge opening and thereby provides a means for adjusting the area covered by the spreader by the fertilizer and seed ejected through discharge opening 26. As the chute 68 is shifted toward the discharge opening 26 the ground area covered by fertilizer at the right side of the mower-spreader increases, and conversely as the chute is shifted away from opening 26 the area is reduced. This permits an adjustment which will effectively cover a swath as wide as ten to fifteen feet or as little as three to five feet. To prevent the grass as it is being cut and the fertilizer or seed as it is discharged from chute 68 from being thrown through slot 70, a cover 72 slidable with the hopper closes the portion of the slot not occupied by the chute.

The discharge of seed and fertilizer from hopper 50 is controlled by a sliding valve 78 in chute 68 moved to and from closed and open positions by a linkage consisting of a bar 80 pivotally supported at its ends by pivoted levers 82 and 84 and a rod 86 connected to lever 84 by an arm 88 and extending to the handle where it can be easily reached by the operator. Bar 80 passes over valve extension 89 between two closely spaced pins 90 and 92 attached to the extension. As rod 86 is pushed away from the handle, levers 82 and 84 are rotated clockwise, causing bar 80 to move away from and pull valve 78 rearwardly, placing slot 94 in the valve beneath the port 96 in the bottom of chute 68. The degree to which port 96 is opened is easily controlled by shifting rod 86 toward or away from the handle until the desired flow from the hopper is obtained. When it is desired to stop the discharge of fertilizer or seed from the hopper, rod 86 is pulled toward the handle until slot 94 no longer registers with slot 96.

The size of the area covered with fertilizer or seed can be further controlled by the use of a door or baffle 100 in passage 26, the door being held therein by any suitable means such as screws 102, 103 and 104. When passage 26 is closed by door 100, the discharge of fertilizer and seed is confined to the area covered by the mower body, thus making it possible to confine the discharge to a relatively small concentrated area. Another advantage of the enclosed effect obtained by the closing of passage 26 is that the fertilizer and seed are discharged directly onto the desired area without exposing the falling or flying material to the wind.

Figure 8:
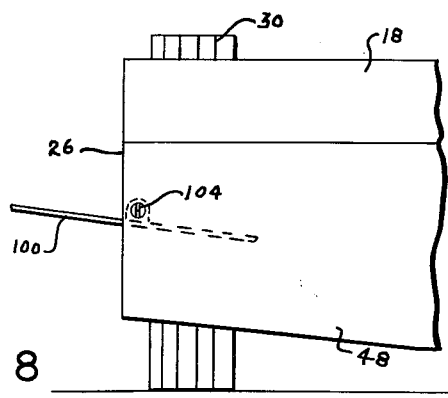
FIGURE 8 is an enlarged fragmentary front elevational view of my mower-spreader combination.

The mower is operated in the usual manner to cut grass, weeds and the like, whether or not the spreader is in operation. When the spreader is to be operated, door 78 is opened and the material in hopper 50 falls through chute 68 onto the revolving blade 22 along the part having deflector 46. The rapidly moving blade throws the material through passage 26 outwardly away from the machine, the area covered by the material being determined primarily by the position of chute 68 along slot 70. The position of the chute along slot 70 may be changed by merely shifting the hopper along rods 52 and 54. The hopper may be held in its adjusted position by any suitable means such as a pin 106 extending downwardly through strap 59 and through one of a series of holes in rod 52. A smaller area can be covered by the spreader by closing door 100, or a greater range can be obtained by placing door 100 or a specially designed baffle in passage 26 in the position shown in FIGURE 8. The baffle may extend under the rotating blade to a point beneath chute 68.

The hopper for powdered fertilizer may be replaced by a container for liquid fertilzer, weed killer and the like, having a neck or tube for dripping the liquid onto the rotating blades. The operation and control of this form of my apparatus is essentially the same as the one described previously herein.

Various changes can be made in the present combination mower and spreader without departing from the scope of my invention. Other types of mechanisms may be used to control the discharge of material from chute 68 and to support and shift the hopper toward and away from passage 26. Instead of a single slot 70, a series of separate holes may be used to permit adjustment of the chute toward and away from outlet 26. A single unadjustable hole will give satisfactory results for and is suitable for a number of uses. In the claims the word "slot" means and includes a single elongated opening and a series of holes, and the word "side" opening is intended to include an opening in the front and back as well as the side. Further, the spreader mechanism may be used with different types of rotary mowers or choppers either used alone or in gangs.

I claim:

1. For use with a mower having a body with a chamber on the underside thereof, a rotating blade with deflectors near each end thereof in said chamber, and a motor for driving the blade, said body having an opening at one side and means defining a slot in the top extending tangentially to the path of the rotating blade toward the side opening, a spreader including a hopper, a chute in the bottom of said hopper for discharging the material in said hopper through said slot onto the mower blade along said deflectors, a support for said hopper secured to said mower body, means on said support for adjusting the chute of said hopper along said slot to vary the area covered by the material discharged from said hopper, a valve in said chute to control the discharge of material from said hopper, a linkage for operating said valve, and a baffle in said opening movable from a vertical fully closed position to a substantially horizontal position.

2. For use with a mower having a body with a chamber on the underside thereof, a rotating blade with deflectors near each end thereof in said chamber, and a motor for driving the blade, said body having an opening at one side and means defining a slot in the top extending tangentially to the path of the rotating blade toward the side opening, a spreader including a hopper, a chute in the bottom of said hopper for discharging the material in said hopper through said slot onto the mower blade along said deflectors, a support for said hopper secured to said mower body, means on said support for adjusting the chute of said hopper along said slot to vary the area covered by the material discharged from said hopper, a valve in said chute to control the discharge of material from said hopper, and a linkage for operating said valve.

3. For use with a mower having a body with a chamber on the underside thereof, a rotating blade in said chamber, and a motor for driving the blade, said body having an opening at one side and means defining a slot in the top extending tangentially to the path of the rotating blade toward the side opening, a spreader including a hopper, a chute near the bottom of said hopper, the lower end of which is registered with said slot for discharging the material in said hopper onto the mower blade, a support for said hopper secured to said mower body, means on said support for adjusting the chute of said hopper along said slot to vary the area covered by the material discharged from said hopper, a valve in said chute to control the discharge of material from said hopper, and a means for operating said valve.

4. In combination with a mower having a body with a chamber on the underside thereof, and a rotating blade in said chamber, said body having an opening at one side, and means defining a slot in the top of said body extending toward the side opening, a spreader including a hopper, a chute near the bottom of said hopper, the lower end of which is registered with said slot for discharging the material in said hopper onto the mower blade, a means for adjusting the position of the chute of said hopper along said slot to vary the area covered by the material discharged from said hopper, and a valve in said chute to control the discharge of material from said hopper.

5. In combination with an apparatus having a body with a chamber on the underside thereof, and a rotating blade in said chamber, said body having an opening at one side, and means defining a slot in the top of said body extending toward the side opening, a spreader including a container, a passage connecting the lower part of said container with said slot, a means for adjusting the position of said container along said slot to vary the area covered by the material discharged from said container, a valve for controlling the discharge of material from said container, and a means in said opening for varying the size thereof from fully closed position to substantially wide open position.

6. In combination with a mower having a body with a chamber on the underside thereof, and a rotating blade in said chamber, said body having an opening at one side, and means defining a slot in the top of said body extending toward the side opening, a spreader including a hopper, means defining a passage connecting the lower part of said hopper with said slot, and a means for adjusting the position of said passage along said slot to vary the area covered by the material discharged from said hopper.

References Cited in the file of this patent

UNITED STATES PATENTS

| | | |
|---|---|---|
| 2,708,334 | Coners | May 17, 1955 |
| 2,759,322 | Herzog | Aug. 21, 1956 |
| 2,792,970 | Gaiman | May 21, 1957 |
| 2,847,224 | Stout | Aug. 12, 1958 |
| 2,861,611 | Considder | Nov. 25, 1958 |
| 2,901,257 | Teagle | Aug. 25, 1959 |
| 2,910,818 | Beal et al. | Nov. 3, 1959 |